H. MARANVILLE.
Postal-Scale and Counterfeit-Coin Detector.

No. 203,057. Patented April 30, 1878.

WITNESSES:
Francis McArdle.
C. Sedgwick

INVENTOR:
H. Maranville
BY Munn&Co
ATTORNEYS.

UNITED STATES PATENT OFFICE.

HARVEY MARANVILLE, OF AKRON, OHIO, ASSIGNOR TO HIMSELF AND SAMUEL D. STEWART, OF SAME PLACE.

IMPROVEMENT IN POSTAL-SCALE AND COUNTERFEIT-COIN DETECTER.

Specification forming part of Letters Patent No. 203,057, dated April 30, 1878; application filed March 7, 1878.

*To all whom it may concern:*

Figure 1:
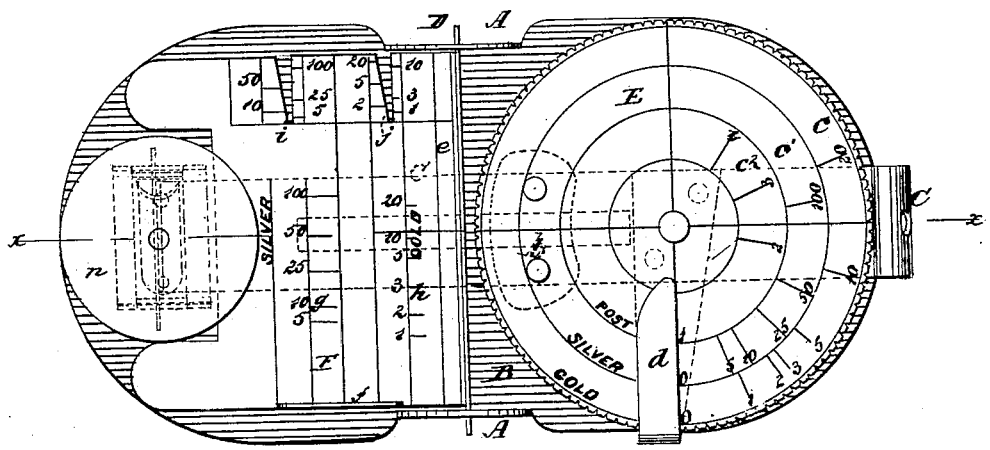
Figure 2:
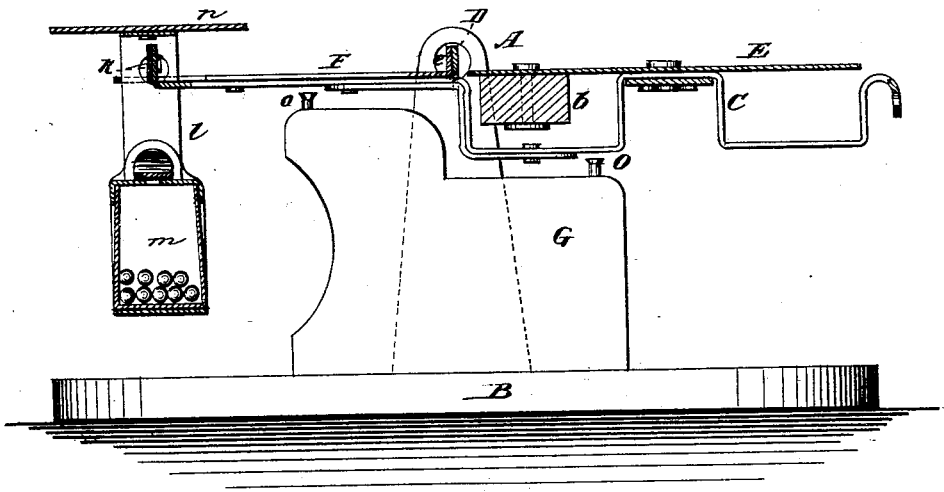

Be it known that I, HARVEY MARANVILLE, of Akron, in the county of Summit and State of Ohio, have invented a new and useful Improvement in Scales, of which the following is a specification:

Figure 1 is a plan view of my improved scales. Fig. 2 is a longitudinal vertical section.

Similar letters of reference indicate corresponding parts.

The object of my invention is to provide scales for testing coin and weighing small articles, more especially coin and mail matter; and it consists in a beam having upon one end a graduated rotating disk, which carries the counterpoise, and upon the other end a scale for measuring the diameter and thickness of coin, and a pivoted platform for receiving the coin or packages to be weighed.

Referring to the drawing, A A are standards projecting perpendicularly from the base B, and C is a beam attached to a cross-bar, D, the edges of which are V-shaped and have a bearing in apertures in the standards A.

A disk, E, is pivoted to the beam C, and carries on its under surface a weight, $b$. The beam is bent or offset to permit of turning the disk, and the upper face of the disk is provided with three sets of graduations—one set for gold, one for silver, and one for mail matter.

The outer circle, $c$, on the disk is graduated for gold, the first graduation being for one dollar, the second for two and one-half dollars, the third for five dollars, the fourth for ten dollars, the fifth for twenty dollars, and so on. The second circle, $c^1$, is graduated for silver, the first graduation being for five cents, the second for ten cents, and so on. The third and inner graduation, $c^2$, represents weights corresponding to certain rates of postage, the first or zero graduation representing a package having a weight requiring one three-cent stamp, the second graduation representing a weight that requires two three-cent stamps, the third three three-cent stamps, and so on.

An arm, $d$, is attached to the beam C, and extends over the upper face of the disk E, and serves as an index in adjusting the disk. Upon the opposite side of the cross-bar D there is a plate, F, which is provided with two lips, $e\ f$, against which to place the coin in measuring the diameter. The lip $e$ is riveted to the bar D, and the lip $f$ is at right angles to it.

Upon the face of the plate F there are two sets of graduations—one set, $g$, for silver coin, and the other set, $h$, for gold coin. The graduations for silver coin range from five cents to one dollar, and graduations for gold coin range from one to twenty dollars.

In the edges of the plate F, opposite the lip $f$, two V-shaped notches, $i\ j$, are formed. The notch $i$, which is for the measurement of the thickness of silver coin, is graduated for five, ten, twenty-five, fifty cents, and one dollar. The notch $j$ is graduated for the measurement of the thickness of gold coin, the graduations being for coins ranging from one to twenty or fifty dollars.

The end of the beam C projects upward through a notch in the outer edge of the plate F, and to it is riveted a bar, $k$, whose upper edge is V-shaped. A stirrup, $l$, having apertures for receiving the ends of the bar $k$, is supported by the said bar, and has attached to it, below the pivot, a box, $m$, for containing shot or sand for adjusting the scale and for keeping the stirrup in a vertical position. A disk, $n$, is attached to the upper end of the stirrup, for receiving coin or other articles to be weighed.

When it is desired to weigh an article, the disk E is turned until the proper graduation appears at the indicating-bar $d$, when the weight $b$ will be in the proper position to counterbalance the article. Coin is measured as to thickness by the V-shaped notches $i\ j$, and its diameter is measured upon the scales $g\ h$ by placing them against the lip $f$.

A block, G, is placed under the beam C, and in it there are two screws, $o$, one each side of the bar D, for limiting the motion of the beam.

The advantages claimed for my improved scale are that it is convenient, simple, and accurate, and, as all of the parts are connected together, none of them can become lost.

Having thus described my invention, I claim as new and desire to secure by Letters Patent—

1. In scales, the beam C, having an upwardly-convex middle bend that supports on a pivot the disk E, and concavities on each side that allow the passage of a weight, $b$, as set forth.

2. The combination of the graduated disks E and plates F, supported on beam C, the former having weight $b$, and the latter a stirrup, as and for the purpose specified.

HARVEY MARANVILLE.

Witnesses:
GEO. G. ALLEN,
G. S. SCOTT.